(12) United States Patent
Kukula et al.

(10) Patent No.: US 8,310,372 B2
(45) Date of Patent: Nov. 13, 2012

(54) FINGERPRINT ACQUISITION SYSTEM AND METHOD USING FORCE MEASUREMENTS

(75) Inventors: Eric P. Kukula, Schererville, IN (US); Shimon K. Modi, Lafayette, IN (US); Stephen J. Elliott, West Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 526 days.

(21) Appl. No.: 12/380,640

(22) Filed: Mar. 2, 2009

(65) Prior Publication Data

US 2009/0219154 A1 Sep. 3, 2009

Related U.S. Application Data

(60) Provisional application No. 61/067,681, filed on Feb. 29, 2008.

(51) Int. Cl.
*G08B 21/00* (2006.01)
(52) U.S. Cl. ...... 340/665; 340/5.53; 340/5.83; 382/116; 382/124

(58) Field of Classification Search .................. 340/665, 340/5.1, 5.2, 5.53, 5.81, 5.83; 235/380, 382, 235/492; 382/115, 116, 124, 125, 127
See application file for complete search history.

(56) References Cited

U.S. PATENT DOCUMENTS

| | | | |
|---|---|---|---|
| 5,050,220 A | 9/1991 | Marsh et al. | |
| 5,572,597 A | 11/1996 | Chang et al. | |
| 5,974,162 A | 10/1999 | Metz et al. | |
| 6,061,463 A | 5/2000 | Metz et al. | |
| 6,064,753 A * | 5/2000 | Bolle et al. | 382/125 |
| 6,125,192 A | 9/2000 | Bjorn et al. | |
| 6,445,811 B1 | 9/2002 | Wada | |
| 6,504,945 B1 | 1/2003 | Helot et al. | |
| 6,912,299 B1 * | 6/2005 | Hoshino | 382/124 |
| 2005/0213799 A1 * | 9/2005 | Sawano | 382/124 |
| 2006/0045315 A1 * | 3/2006 | Saitoh et al. | 382/115 |
| 2008/0166028 A1 * | 7/2008 | Turek et al. | 382/124 |
| 2008/0212846 A1 * | 9/2008 | Yamamoto et al. | 382/115 |
| 2010/0066697 A1 * | 3/2010 | Jacomet et al. | 345/173 |

* cited by examiner

*Primary Examiner* — Hung T. Nguyen
(74) *Attorney, Agent, or Firm* — Faegre Baker Daniels LLP

(57) ABSTRACT

An apparatus and method of optimizing performance of a fingerprint sensor includes determining whether a force applied to a sensing portion of the sensor is within an optimal force range for the fingerprint sensor and capturing at least one fingerprint image with the fingerprint sensor after the applied force is in the optimal force range.

19 Claims, 11 Drawing Sheets

FINGERPRINT ACQUISITION SYSTEM AND METHOD USING FORCE MEASUREMENTS

CROSS REFERENCE TO RELATED APPLICATIONS

This application claims the benefit of U.S. Provisional Application Ser. No. 61/067,681, filed on Feb. 29, 2008, which is expressly incorporated by reference herein.

BACKGROUND AND SUMMARY OF THE INVENTION

The present invention relates to improvements in the data acquisition process for biometric sensors such as the acquisition of fingerprints by fingerprint recognition sensors.

Automated biometric sensors are used to establish or authenticate the identity of a person based on biological characteristics that are in possession of the person. One such biometric sensor is a fingerprint recognition sensor. Various types of fingerprint recognition sensors are known including optical sensors, capacitance sensors, thermal sensors, and ultrasonic sensors.

The present invention uses quantitative measurements of forces that an individual applies to a fingerprint sensor to improve the acquisition process. The system and method of the present invention illustratively creates a lookup table of force measurements for multiple fingerprint sensing technologies in order to acquire the highest quality fingerprint images. The optimal finger force to produce the best results varies by fingerprint sensing technology.

The present invention provides an improved fingerprint acquisition algorithm through a constant monitoring of forces applied to a fingerprint sensor by the user's finger. This monitoring allows for acquisition of the fingerprint image to occur when the force level is in an optimal range. The optimal range is illustratively listed in a lookup table accessible by the device. The acquisition algorithm also provides feedback/guidance to the user on how much pressure to apply on the device by comparing the actual force applied to the optimal pressure value for the particular device retrieved from the lookup table.

The system and method of the present invention may be integrated in any fingerprint recognition system. Primary applications include, but are not limited to: law enforcement, registered traveler programs, financial services, healthcare, telecommunications, social services, electronic commerce, and access control.

The present invention improves the quality of fingerprint images that are acquired by the fingerprint recognition system by providing a lookup table of force measurements for different fingerprint sensor technologies, and by providing constructive feedback to the user. These improvements permit higher quality images to be acquired by the fingerprint system, leading to improved matching performance. Image quality is a predictor of matching performance for detection and recognition systems. Knowledge of the force level significantly increases the average reported image quality score by about 20% if knowledge of the fingerprint sensing technology and applied force is known. Correspondingly, fingerprint matching performance can improve over 10% for optical and capacitance technologies if knowledge of the fingerprint sensing technology and applied force is known.

The present system and method analyzes the impact of human interaction with fingerprint sensors and the implications on image quality and subsequent algorithm performance. The significance of user interaction with various fingerprint recognition sensor technologies is apparent, given that fingerprint recognition is the most widely used of the biometric technologies, with popular applications in law enforcement (e.g., the Integrated Automated Fingerprint Identification System—IAFIS), access control, time and attendance recordkeeping, and personal computer/network access. Fingerprint identification is also used with personal data assistants, mobile phones, laptop computers, desktop keyboards, mice, and universal serial bus (USB) flash media drives.

In an illustrated embodiment of the present disclosure, a method of optimizing performance of a fingerprint sensor comprises detecting placement of at least one finger on the fingerprint sensor, determining a force applied to the sensor by the at least one finger, determining whether the force is within an optimal force range for the fingerprint sensor, providing feedback to a user to adjust the applied force if the applied force is outside the optimal force range, and capturing at least one fingerprint image with the fingerprint sensor after the applied force is in the optimal force range.

In another illustrated embodiment of the present disclosure, a method of optimizing performance of a fingerprint sensor comprises storing a plurality of optimal force ranges and optimal image quality scores and for each of a plurality of different fingerprint sensors in a database accessible by a computer, and receiving captured data from a remote fingerprint sensor at the computer. The captured data includes a remote fingerprint sensor identification, an image quality score for at least one captured fingerprint, and a force parameter for the at least one captured fingerprint. The method also includes identifying a particular type of fingerprint sensor being used as the remote fingerprint sensor based on the fingerprint sensor identification, comparing the received image quality scores and force parameters for the at least one fingerprint to the optimal force ranges and image quality scores for the particular type of fingerprint sensor stored in a database, and taking an action if at least one of the received image quality scores and the received force parameters differ from the optimal force ranges and optimal image quality scores by a predetermined amount.

In yet another illustrated embodiment of the present disclosure, a sensing apparatus includes a fingerprint sensor having a sensing portion to receive at least one finger of a person, a force sensor coupled to the fingerprint sensor to detect a finger pressure on the sensing portion of the fingerprint sensor, a processor coupled to the fingerprint sensor and the force sensor, an indicator coupled to the processor, and a memory coupled to the processor. The memory stores an optimal force range for the finger pressure applied to the sensing portion. The apparatus also includes software executable by the processor for detecting placement of at least one finger on the fingerprint sensor, for determining a force applied to the sensor by the at least one finger, for determining whether the force is within an optimal force range for the fingerprint sensor, for providing feedback to the indicator to advise a user to adjust the applied force if the applied force is outside the optimal force range, and for capturing at least one fingerprint image with the fingerprint sensor after the applied force is in the optimal force range.

In still another illustrated embodiment of the present disclosure, a method of optimizing performance of a fingerprint sensor includes determining an optimal force range for initiating fingerprint acquisition in each of a plurality of different types of fingerprint sensors, storing the optimal force ranges for initiating fingerprint acquisition in a plurality of different types of fingerprint sensors in a database in a memory accessible by a computer, an optimal force range being linked to each of the plurality of different types of fingerprint sensors in the database, receiving a request for an optimal force range from a particular fingerprint sensor with the computer over a communication network, accessing the database with the computer to determine the optimal force range for the particular fingerprint sensor, and transmitting the optimal force range for the particular fingerprint sensor from the computer to the particular fingerprint sensor over the communication network.

Additional features of the present invention will become apparent to those skilled in the art upon consideration of the following detailed description of illustrative embodiments exemplifying the best mode of carrying out the invention as presently perceived.

BRIEF DESCRIPTION OF THE DRAWINGS

The above-mentioned other features of this invention, and the manner of attaining them will become more apparent and the invention itself will be better understood by reference to the following description of illustrated embodiments of the invention taken in conjunction with the accompanying drawings, wherein.

DETAILED DESCRIPTION OF THE DRAWINGS

Figure 1:
FIG. 1 illustrates a plurality fingerprint images and quality scores for five different force levels in both optical and capacitance sensors.
Figure 1:
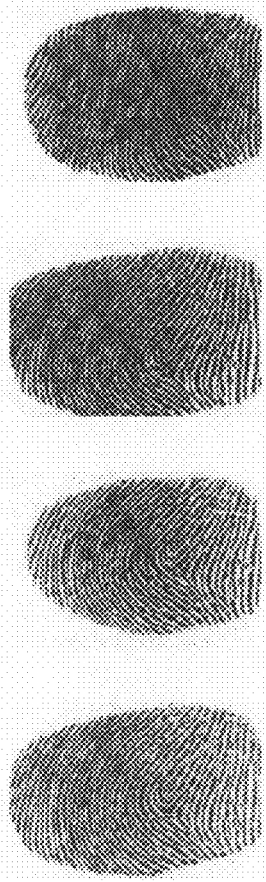

For the purposes of promoting an understanding of the principles of the invention, reference will now be made to certain illustrated embodiments and specific language will be used to describe the same. No limitation of the scope of the claims is thereby intended. Such alterations and further modifications of the invention, and such further applications of the principles of the invention as described and claimed herein as would normally occur to one skilled in the art to which the invention pertains, are contemplated, and desired to be protected.

The present system and method provides a comparative evaluation of optical and capacitance fingerprint sensors to determine the effect on different fingerprint sensing technologies by finger force. Illustratively, five force levels were used and measured in newtons (N): 3N, 5N, 7N, 9N, and 11N. The force levels were measured with a dual-range force sensor. Interaction was limited to the subject's right index finger for both sensors to minimize the variability of measurement relative to dexterity and finger size. Variability that naturally occurs between individuals was treated as an uncontrollable factor. Once the fingerprint samples were collected, the prints were analyzed using commercially available quality analysis software. The following variables were reported by the software: image quality score, minutiae, and the number of core(s)/delta(s).

The image quality score ranged from 0-99, with zero (0) being the lowest possible quality image score and 99 being the highest possible quality score. Fingerprint feature extraction and feature matching was illustratively performed using the Neurotechnologija VeriFinger 5.0 algorithm which is incorporated herein by reference. Several different metrics may be used for analyzing matching performance of a dataset including False Non-Match Rates (FNMR) and False Match Rates (FMR) to determine the performance of different force levels. A combined graphical representation of FNMR and FMR may be created using Detection Error Tradeoff (DET) curves, which indicate a combination of FNMR and FMR at every possible threshold value of the fingerprint matcher. DET curves were created for fingerprints captured at each force level, and then DET curves were created for fingerprint datasets that resulted by combining every possible pair of force levels. This methodology was performed separately for fingerprints collected from the optical and capacitive sensors.

To analyze the results, both parametric and nonparametric analysis of variance methods were used, based solely on model assumptions and the resulting diagnostics image quality scores and number of detected minutiae. Analysis of variance methods to compare the effect of multiple levels of one factor (force) on a response variable (image quality, number of minutiae) yielded a generalization of the two-sample t-test.
Parametric—Number of Detected Minutiae The parametric method is known as Analysis of Variance, or ANOVA. Parametric tests, like their nonparametric counterparts, involve hypothesis testing, but parametric tests require a stringent set of assumptions that must be met (NIST/SEMATECH, 2006). The ANOVA is partitioned into two segments: the variation that is explained by the model (1) and the variation that is not explained (the error) (2), which are both used to calculate the F-statistic (3) testing the hypothesis $H_o: \mu_1 = \mu_2 = \ldots =$ and $H_a$: not all $\mu$'s are the same. In practice, p values are used, but the $F_{observed}$ test statistic can also be compared to the F distribution table, as shown in (4). Typically, when the $H_o$ is rejected, the variation of the model (SSM) tends to be larger than the error (SSE), which corresponds to a larger F value. The number of detected minutiae was analyzed using this methodology:

$$SSM = \Sigma(\hat{Y}_i - \bar{Y})^2, dfM = 1, MSM = SSM/dfM \tag{1}$$

$$SSE = \Sigma(Y_i - \hat{Y}_i)^2, dfE = n-2, MSE = SSE/dfE \tag{2}$$

$$F = MSM/MSE \sim F(dfM, dfE) \tag{3}$$

$$F \geq F(1-\alpha, djM, dfE) \tag{4}$$

Nonparametric—Image Quality Score

In situations where normality assumptions fail to be met, alternative statistical methods to the F-test analysis of variance may be used. Nonparametric methods are those that are distribution-free and are typically used when measurements are categorical, parametric model assumptions cannot be met, or analysis requires investigation into features such as randomness, independence, symmetry, or goodness of fit, rather than testing hypotheses about values of population parameters (NIST/SEMATECH, 2006).

One of the more common nonparametric methods was developed by Kruskal and Wallis (1952, 1953). The Kruskal-Wallis test examines the equality of medians for two or more populations and examines the hypotheses $H_o$ (the population medians are all equal) and $H_a$ (the medians are not all the same), with the assumption that samples taken from different populations are independent random samples from continuous distributions with similar shapes. The Kruskal-Wallis test computes the H statistic, as shown in (5). Image quality scores were analyzed with this method to address skewness of scores to the left.

$$H = \left[\frac{12}{N(N+1)}\right]\sum_{i=1}^{a}\frac{R_i^2}{n_i} - 3(N+1), \quad (5)$$

where $\alpha$ equals the number of samples (groups), $n_i$ is the number of observations for the $i^{th}$ sample, N is the total number of observations, and $R_i$ is the sum of ranks for group i (NIST/SEMATECH, 2006).

Evaluation and Experimental Results

The evaluation consisted of 75 participants, 18-25 years old. All participants used their right index finger, and three images were collected at each force level and for both sensing technologies. The five force levels investigated were illustratively, 3N, 5N, 7N, 9N, and 11N. Fingerprint images for two subjects at each of the corresponding force levels and the two sensing technologies can be seen in FIG. 1. Results are illustratively documented in terms of minutiae count analysis, image quality analysis, and performance analysis.

Number of Detected Minutiae

The number of minutiae detected from a fingerprint image can vary according to the force applied by the finger on the surface of the sensor. An ANOVA test was performed at a significance level ($\alpha$) of 0.05 to determine whether the average minutiae count between the force levels are statistically significant for the optical sensor. The p-value of less than 0.05 was observed, which indicated that the minutiae counts between the force levels were statistically different. In order to test which groups were significantly different, the Tukey test for pairwise comparisons was performed. The results of the pairwise comparisons and descriptive statistics are shown in Tables 1 and 2, respectively. The results showed that the 3N average minutiae count was significantly different from all the other force level average minutiae counts.

TABLE 1

Tukey pairwise comparison results for optical sensor

|  | 3 N | 5 N | 7 N | 9 N | 11 N |
|---|---|---|---|---|---|
| 3 N | — | p < .05 | p < .05 | p < .05 | p < .05 |
| 5 N |  | — | p < .05 | p < .05 | p < .05 |
| 7 N |  |  | — | n.s. | p < .05 |
| 9 N |  |  |  | — | n.s. |
| 11 N |  |  |  |  | — |

TABLE 2

Descriptive statistics for number of detected minutiae by sensor type

| Force Level | Optical | | | Capacitance | | |
|---|---|---|---|---|---|---|
|  | N | μ | σ | N | μ | σ |
| 3 N | 228 | 39.78 | 13.25 | 228 | 39.62 | 11.15 |
| 5 N | 228 | 43.72 | 13.12 | 224 | 40.76 | 11.40 |
| 7 N | 228 | 46.99 | 12.12 | 227 | 41.75 | 11.27 |
| 9 N | 228 | 48.61 | 11.77 | 228 | 41.01 | 10.96 |
| 11 N | 228 | 50.65 | 12.06 | 228 | 40.96 | 12.22 |

A similar ANOVA test was performed at a significance level of 0.05 to determine whether the average minutiae counts between the force levels are statistically significant for the capacitive sensor. The ANOVA test had a p-value=0.387, which indicated that the minutiae counts between the force levels did not demonstrate a statistically significant difference. The descriptive statistics are presented in Table 2.

Figure 2:
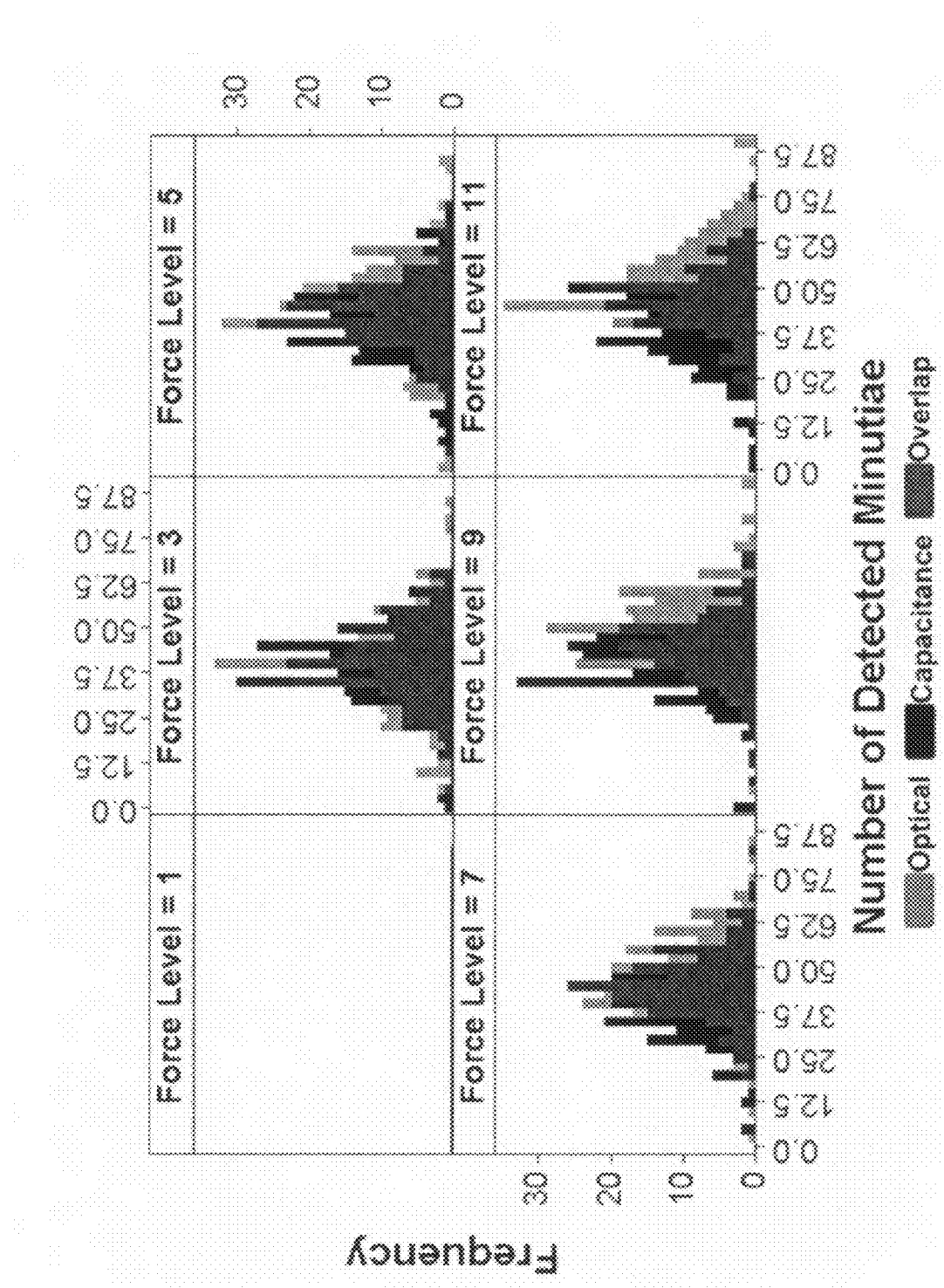
FIG. 2 is a histogram of the number of detected minutiae by force level and sensor technology.

To further examine the differences in the number of detected minutiae across the optical and capacitance sensors, overlapping histograms were constructed, as shown in FIG. 2.

Image Quality

As described in the experimental design, image quality failed to meet the parametric ANOVA model assumptions due to skewness of the image quality scores. Thus, the nonparametric Kruskal-Wallis (H) test was used to analyze the image quality scores for both sensors.

The results of the nonparametric test for the image quality scores from the optical sensor revealed a statistically significant difference among the median image quality scores across the five force levels, $H(0.95, 4)=47.96$, resulting in a p-value less than 0.05. By examining the descriptive statistics for the optical image quality scores, as shown in Table 3, patterns can be found in the mean, median, and standard deviation. The mean and median increase as force increases, while the variation between the image quality scores for a particular level decrease as force increases.

TABLE 3

Descriptive statistics for optical image quality scores

| Force Level | N | μ | x̃ | σ |
|---|---|---|---|---|
| 3N | 228 | 75.25 | 80.0 | 17.05 |
| 5N | 228 | 78.52 | 84.0 | 16.79 |
| 7N | 228 | 81.15 | 86.0 | 13.15 |
| 9N | 228 | 81.94 | 86.0 | 11.62 |
| 11N | 228 | 82.25 | 86.0 | 10.95 |

However, the descriptive statistics for the capacitance image quality scores exhibit the opposite behaviour, as shown in Table 4. For the capacitance image quality scores, the mean and median decrease as force increases, while the variation between the image quality scores for a particular level increases as force increases. The results for the nonparametric test for the capacitance image quality scores revealed the same thing; that is, there is a statistically significant difference among the median image quality score across the five force levels, $H(0.95, 4)=87.30$, resulting in a p-value less than 0.05.

TABLE 4

Descriptive statistics for capacitance image quality scores

| Force Level | N | μ | x̃ | σ |
|---|---|---|---|---|
| 3N | 228 | 83.79 | 87.0 | 12.07 |
| 5N | 224 | 80.87 | 87.0 | 16.31 |
| 7N | 227 | 78.41 | 85.0 | 17.71 |
| 9N | 228 | 74.26 | 82.5 | 20.30 |
| 11N | 228 | 69.96 | 77.0 | 22.20 |

Figure 3:
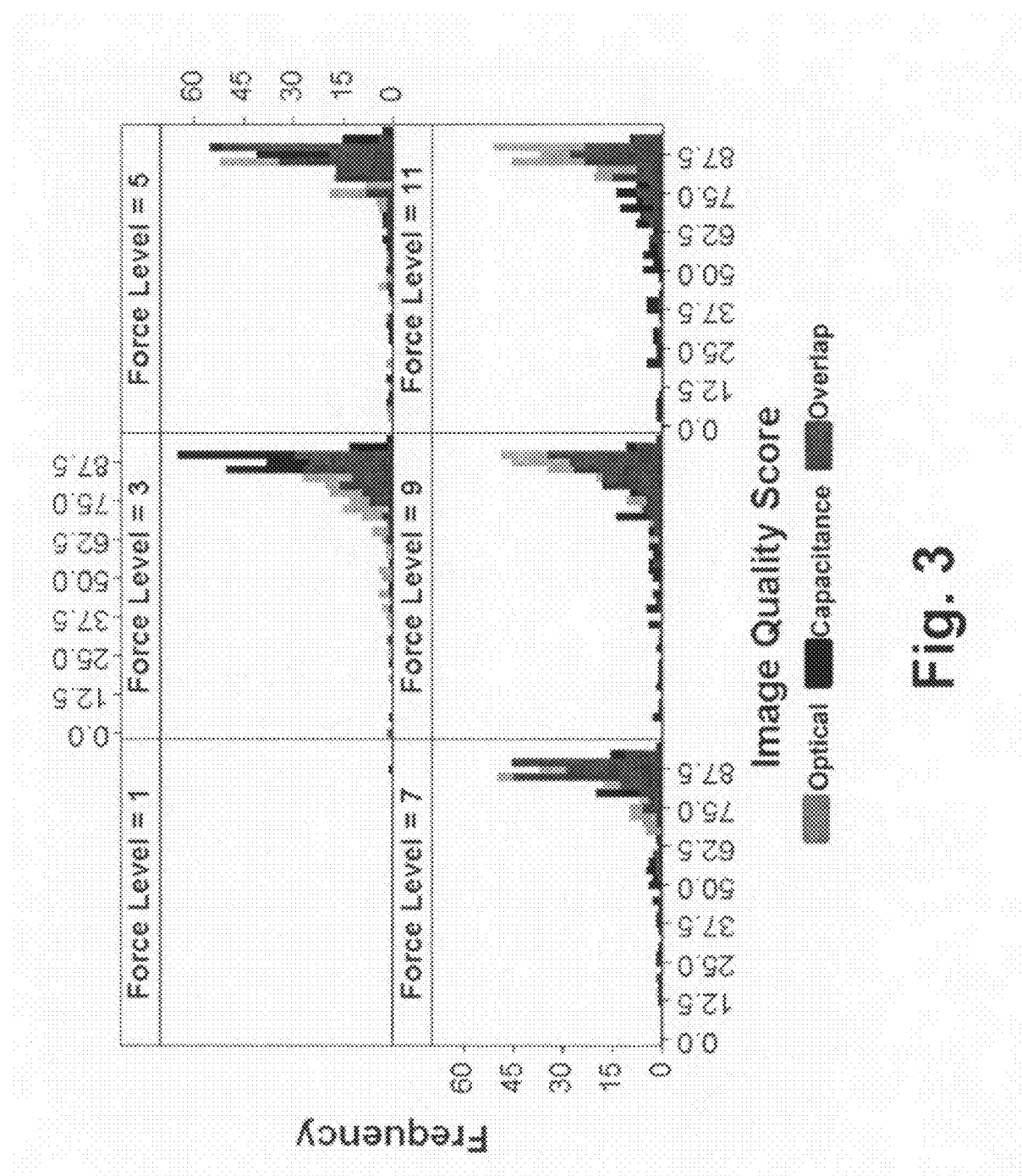
FIG. 3 is a histogram of image quality scores by force level and sensor technology.

To further illustrate the different patterns in image quality data, histograms for the optical and capacitance sensor image quality scores were constructed by force level, shown in FIG. 3.

Full Dataset Matching Performance

Once the fingerprint image characteristics were analyzed, performance of all the collected fingerprint images from different force levels was analyzed using a minutiae-based matcher. DET curves were created to graphically represent the results.

Figure 4:
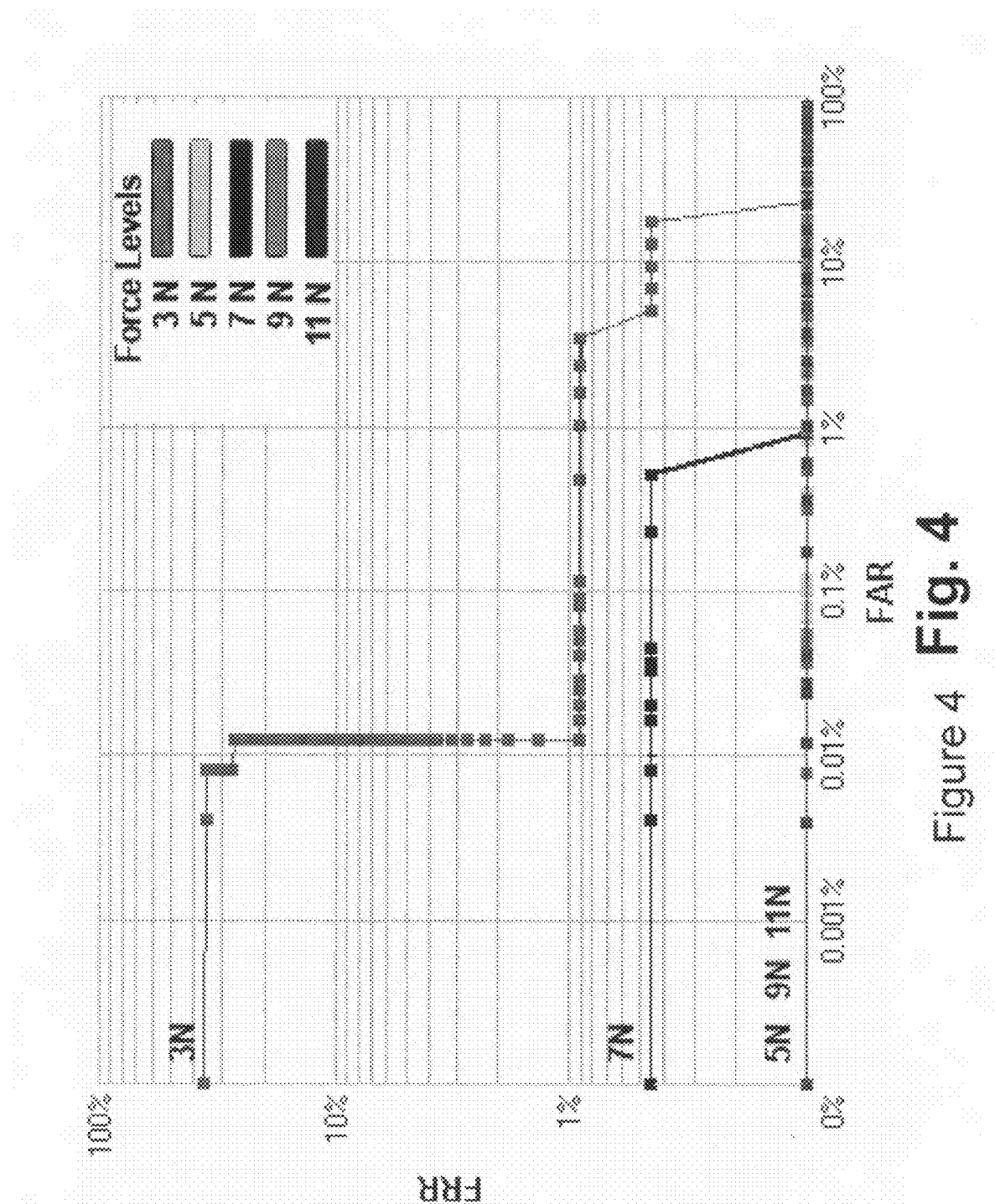
FIG. 4 is a Detection Error Tradeoff (DET) curve for a full set of optical images.

FIG. 4 shows the DET curves for fingerprint images from each force level on the optical sensor. Note the flatness of the DET curves for 5N, 9N, and 11N, indicative of an optimal state. The DET curve for fingerprint images collected at 3N showed the poorest performance.

Figure 5:
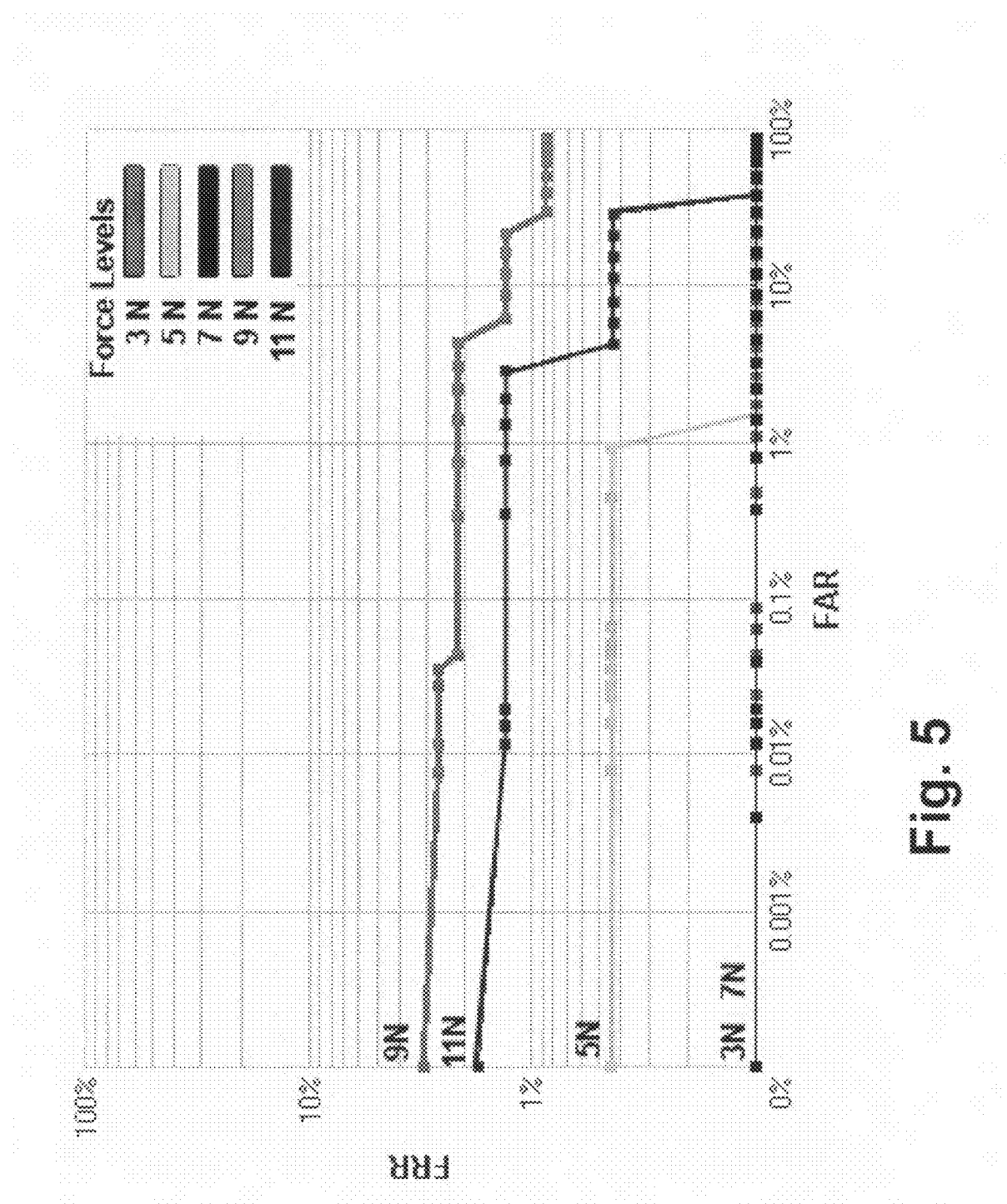
FIG. 5 is a DET of the full set of capacitance images.

FIG. 5 shows DET curves for fingerprint images from each force level collected on the capacitance sensor. Note the flatness of the 3N and 7N DET curves, indicative of an optimal state, whereas performance deteriorates for force levels 5N, 11N, and 9N.

The full dataset DET for the optical and capacitance sensor indicated that performance varies for fingerprint images collected at different force levels. The optimal force level for matching performance is different for the two types of sensor.

Lowest 5% Quality Removed Matching Performance

Figure 6:
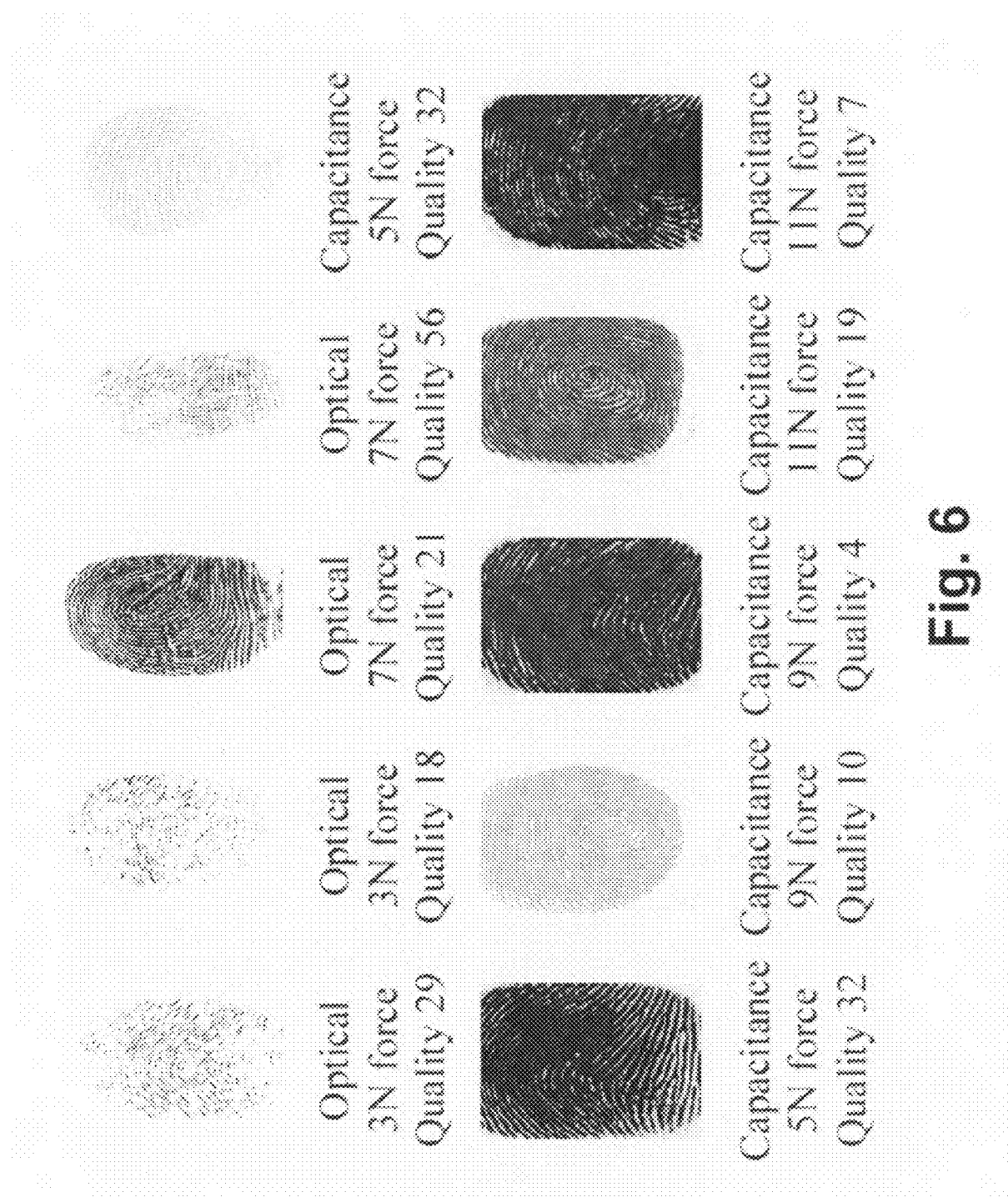
FIG. 6 illustrates selected images (2 per force level and technology) removed as part of the 5% lowest quality bin.

Having established the impact of force levels on the different sensor technologies, the impact of image quality on matching performance of the different force levels for the two sensors was analyzed. Variations in the image quality score results for both sensor technologies and evidence of patterns in the descriptive data indicated that performance might improve if some of the lowest quality images, in terms of reported image quality scores, were removed. The size of the dataset (n=75) prompted the removal of images producing the lowest 5% quality scores for each force level; as such, 11 images were removed. FIG. 6 shows two example images for each sensor type and force level combinations that were included in the lowest 5% category that did not achieve optimal matching accuracy and were removed from consideration for this particular analysis.

Figure 7:
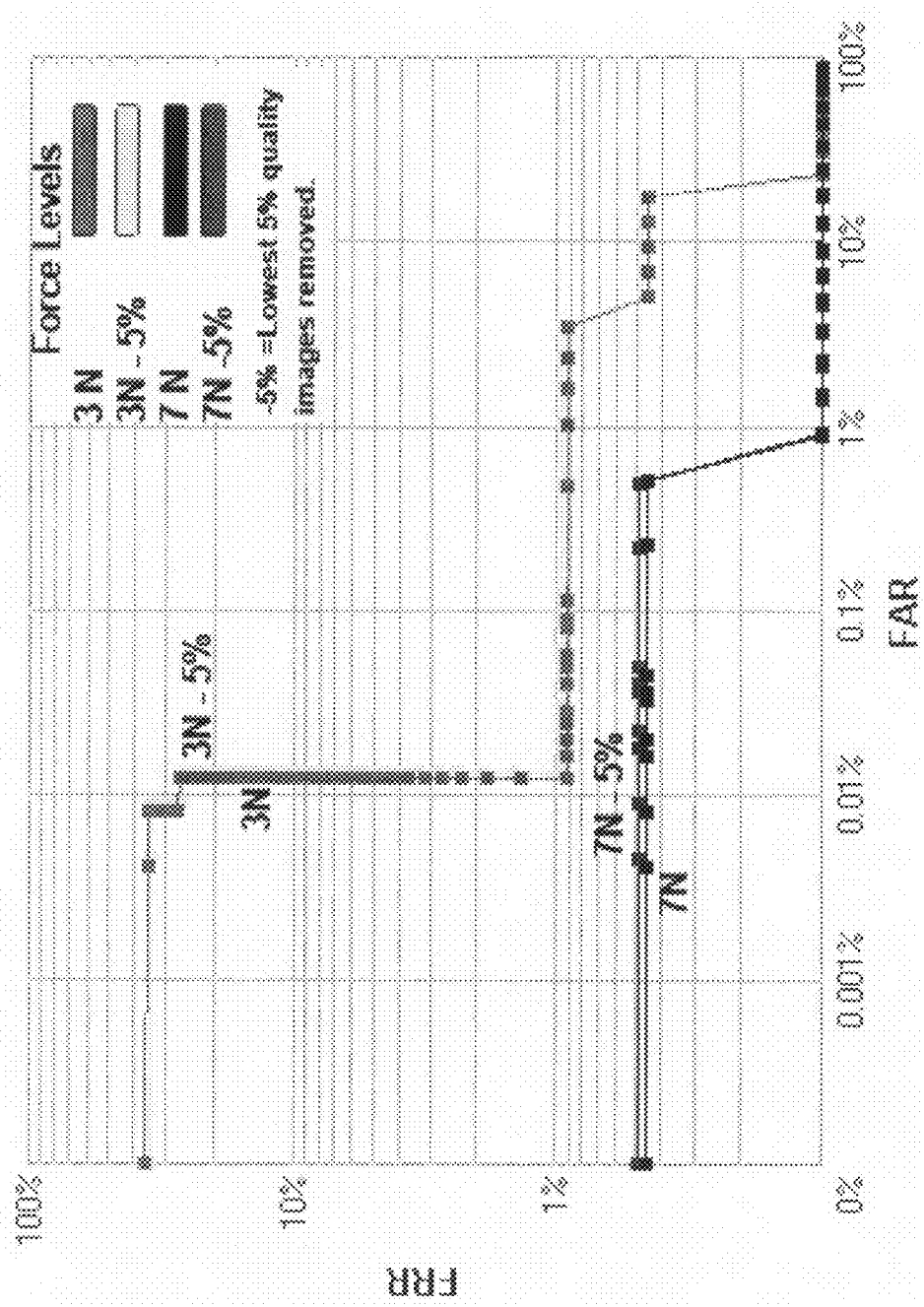
FIG. 7 is a DET of optical images, lowest 5% quality images removed.

The DET curves in FIG. 7 reveal that removal of the lowest 5% quality images collected on the optical sensor at force levels of 3N and 7N yielded negligible changes to system performance. An inward shift in the DET curve would have indicated an improvement in performance, which was not noticed for the 3N and 7N fingerprint datasets.

Figure 8:
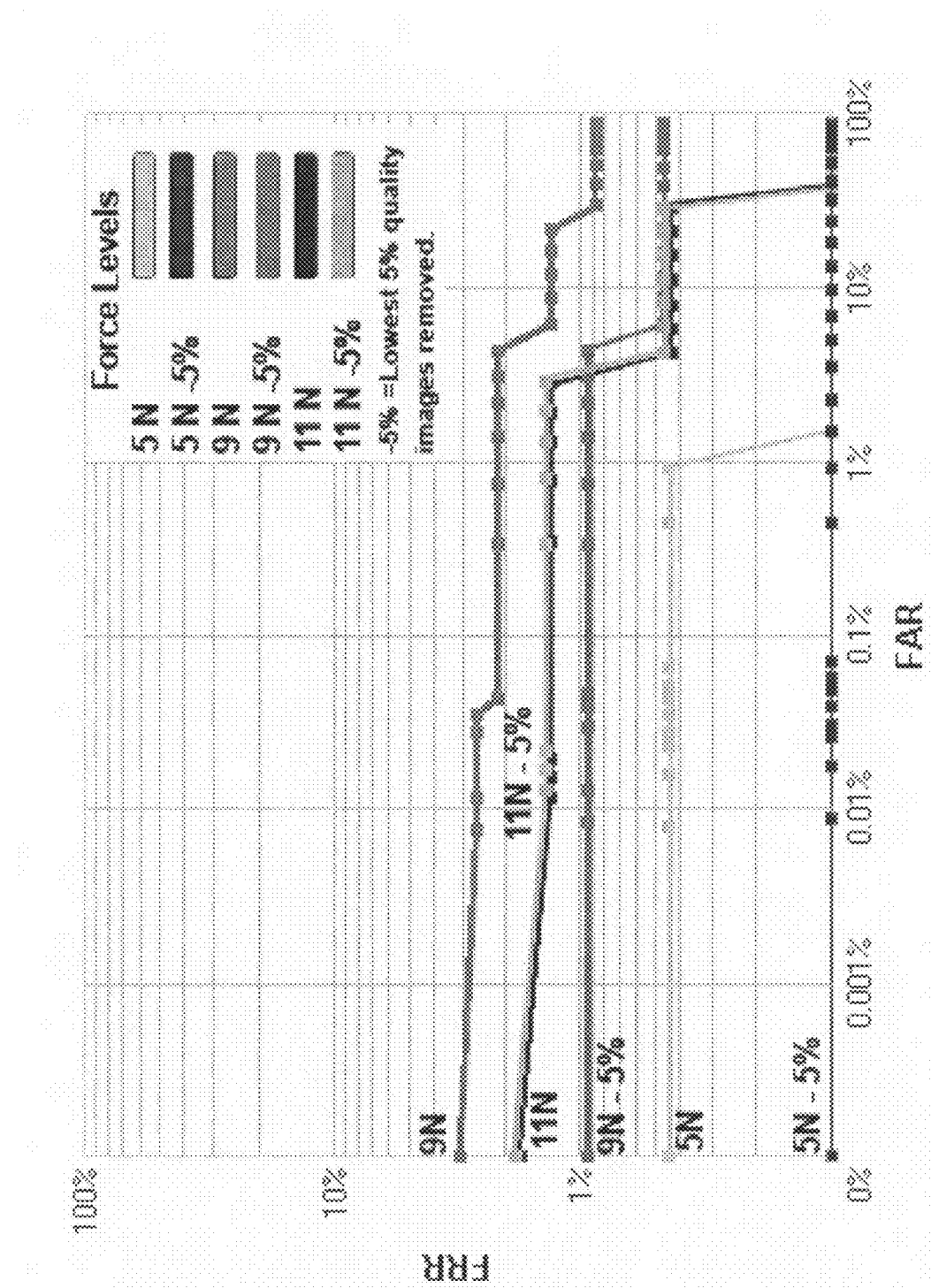
FIG. 8 is a DET of capacitance images, lowest 5% quality images removed.

However, the DET curves in FIG. 8 reveal that removal of the lowest 5% quality images for the capacitance force levels 5N, 9N, and 11N resulted in shifts of the DET curves for two of the three force levels, 5N and 9N. In particular, the 5N DET curve shifted to reach optimal matching accuracy, as noted by the flattened curve. The 9N DET curve also demonstrated a noticeable improvement. There were negligible improvements to the DET curve for 11N when the lowest 5% quality images were removed.

Removal of the lowest 5% quality images collected on the capacitive sensor showed a different behaviour compared to the optical sensor. FIG. 8 shows that the DET curve for fingerprints collected at the 5N level was flat after the lowest quality images were removed. Removal of the lowest quality images resulted in optimal performance for fingerprints collected at the 5N level. Removal of the lowest quality images at the 9N and 11N levels yielded an insignificant improvement in performance. Removal of the lowest quality images does not necessarily lead to an improvement in performance rates for all force levels. The inconsistent behaviour of image quality and performance rates at different levels of force was a surprising observation of this analysis.

The present system and method compares the effect of force on the minutiae counts, image quality scores, and fingerprint matching performance of optical and capacitance fingerprint sensors. Comparing these two sensor technologies reveals that increasing the amount of force applied to the sensor surface has an inverse impact on the quality scores. Images collected from a capacitance sensor are of a higher quality when captured at the lower end of the force range. In contrast, images collected from an optical sensor are of a higher quality when captured at the higher end of the force range. This is an important observation to consider when instructing individuals in how best to interact with a particular sensor technology, so that images captured by that technology have a quality score sufficiently high to optimize performance of the matching system. The minutiae counts significantly increased with increasing levels of force when using optical sensors, but had no significant difference relative to this factor when using capacitance sensors.

Matching performance for the full dataset using optical and capacitive sensors showed very different performance levels for fingerprint images collected at different force levels. The optimal force level for matching performance is different for the two sensors and exhibits similar behaviours for the image quality analysis. Removal of low-quality images alone will not always improve the matching performance of a system. Further studies are needed to determine what other factors affect the system matching performance.

Figure 9:
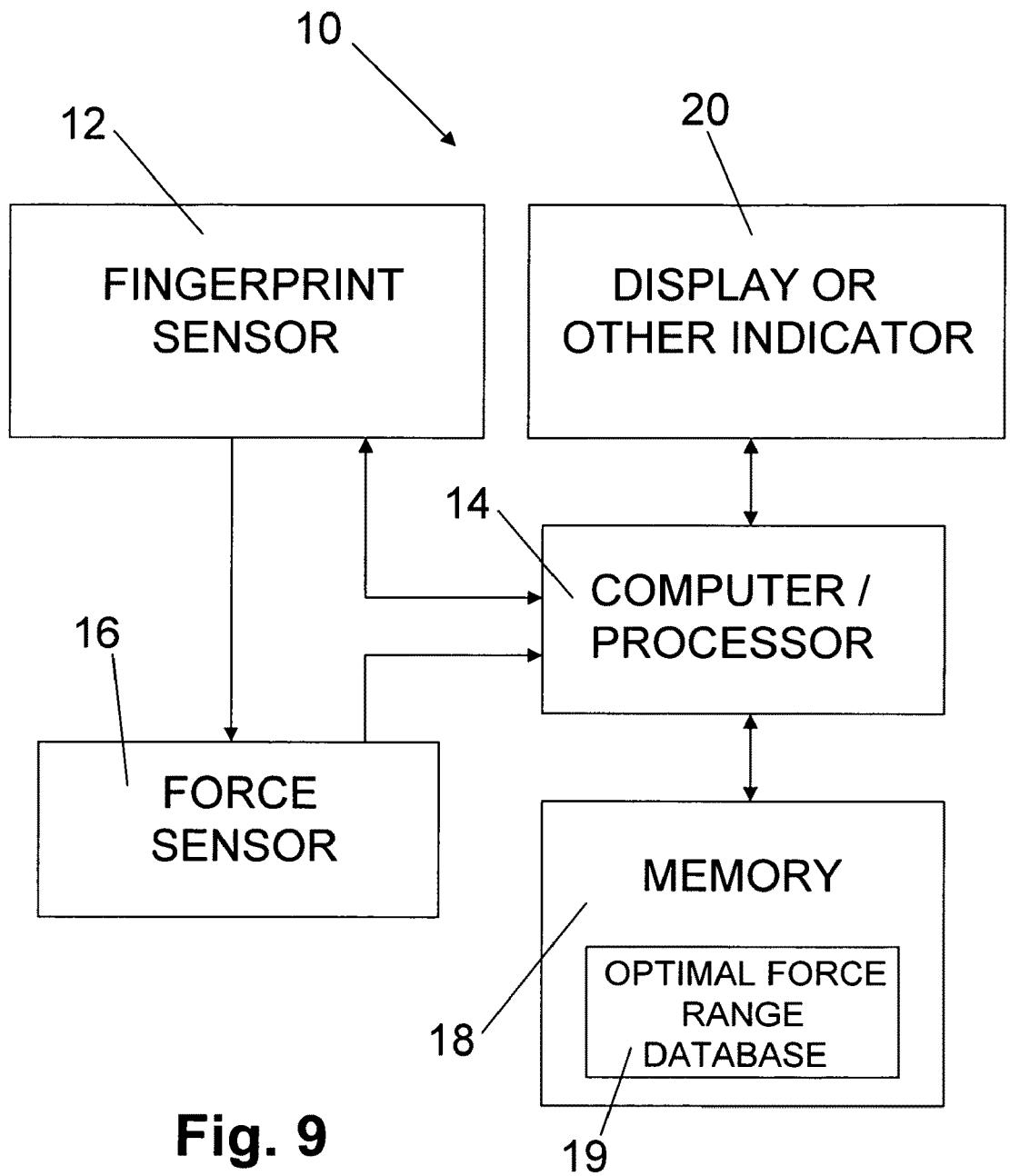
FIG. 9 is a block diagram of an improved fingerprint sensing device of the present invention.

FIG. 9 illustrates an improved biometric sensor 10 of the present invention. In the illustrated embodiment, the biometric sensor 10 includes a fingerprint sensor 12 capable of identifying, recognizing and/or authenticating fingerprints when a user's finger is placed on a sensing portion of the fingerprint sensor 12. It is understood that fingerprint sensor 12 may be any conventional fingerprint recognition system. Typical fingerprint sensors 12 include optical sensors, capacitive sensors and ultrasonic sensors. Many such fingerprint sensors are known and have been certified by the FBI to be in compliance with the FBI's Integrated Automated Fingerprint Identification System Image Quality Specifications.

Fingerprint sensor 12 is coupled to a computer 14. Computer 14 may be separate from sensor 12 or a microprocessor or other processor or controller integrated with the fingerprint sensor 12. Computer 14 processes information received from the fingerprint sensor 12 to detect, identify and authenticate fingerprints based on previously stored fingerprint data.

As discussed above, the pressure or force applied by the user to the fingerprint sensor can affect the quality of the fingerprint image detected and therefore the ability of computer 14 to recognize or identify the fingerprint. In the present invention, a force sensor 16 is coupled to the fingerprint sensor 12 to detect an amount of force applied by the user to the fingerprint sensor 12. Force sensor 16 is coupled to computer 14. Therefore, force readings from the force sensor 16 are provided to the computer 14.

Computer 14 is also coupled to a memory 18. Memory 18 stores a force measurement database. Memory 18 may be provided at the same location as the fingerprint sensor 12, or memory 18 may be coupled to computer 14 via a wireless or wired communication network (not shown). In other words, the memory 18 may be located at a remote location and coupled to a server which provides data from the memory 18 to the computer 14.

Computer 14 is also coupled to a display or other indicator 20. The display or other indicator 20 provides a visual and/or audio feedback or instructions to the user of fingerprint sensor 12.

The fingerprint sensor 12 acquisition process of the present invention is comprised of two different parts or steps including the creation of lookup table of force measurements, and the modification of the acquisition process.

The first step of the acquisition process comprises of creating a look up table of optimal pressure measurements for initiating the fingerprint acquisition. This step is illustratively performed in a laboratory environment by performing experiments. The experiments involve human subjects placing their fingers on the fingerprint sensor 12 at various pressure levels and then performing an image quality analysis and performance analysis to find the optimal pressure measurement for the particular sensor using feedback from the force sensor 16. A table of optimal pressure measurements is illustratively created for all the fingerprint sensors 12 which have been tested in the laboratory. Image quality analysis illustratively may be performed using a commercially available quality analysis software such as Aware Wavelet Scalar Quantization (WSQ) VBQuality software, for example, which outputs a score between 0 and 100. A higher score indicates a better quality fingerprint image.

Performance is measured using the False Reject Rates (FRR) and False Accept Rates (FAR). A method for measuring improvement is to hold the FAR constant and measure the change in FRR. A commercially available fingerprint matching software such as Neurotechnologija™ VeriFinger 5.0 software, for example, is used to calculate the FAR and FRR for the fingerprint images. The pressure measurement detected by force sensor 16 which produces the highest quality images and lowest levels of FAR and FRR is illustratively chosen as the optimal pressure value for a particular sensor 12. This optimal pressure value varies depending on the type of sensor being used. Therefore, the lookup table provides an optimal pressure value for each sensor tested.

The second step of the acquisition process incorporates the lookup table into the fingerprint acquisition process. The lookup table or other database 19 is stored in memory 18. Database 19 includes a lookup table of optimal force ranges for a plurality of different fingerprint sensors 12.

Figure 10:
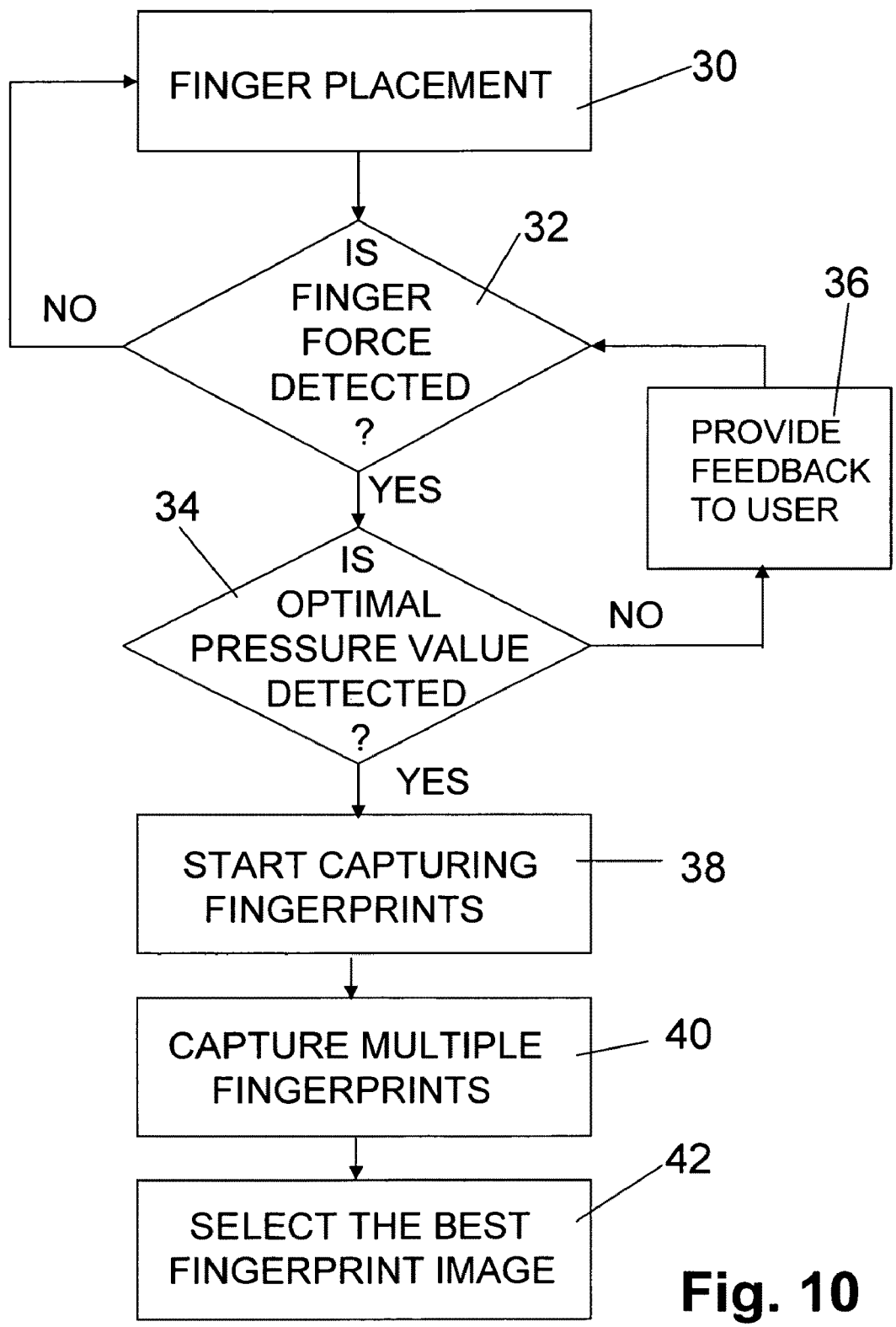
FIG. 10 is a flow chart illustrating steps performed by the fingerprint sensing device to improve acquisition of fingerprints in accordance with the present invention.

Operation of the biometric sensor 10 is illustrated in FIG. 10. The system monitors for finger placement on the fingerprint sensor 12 as illustrated at block 30. In the illustrated embodiment, computer 14 monitors an output from force sensor 16 to determine whether or not a finger force is detected as illustrated at block 32. If no finger force is detected at block 32, computer 14 continues to monitor for finger placement on the sensor at block 30. If a finger force is detected at block 32, the computer 14 continues to monitor the output from force sensor 16 to determine whether or not an optimal pressure value for the particular fingerprint sensor 12 is detected at block 34. As discussed above, computer 14 accesses the memory 18 using the look-up table or other database to determine the optimal pressure value for the particular fingerprint sensor 12 being used.

The optimal pressure value may be a specific value or a range of values which provide the optimal image quality or identification capability for the particular fingerprint sensor 12 as measured through the testing process discussed above. For example, an optimal pressure range for optical sensors may be about 4N to about 9N. An optimal pressure range for capacitive sensors may be about 3N to about 7N. These ranges will vary depending on the type of sensor and manufacturer of the sensor. In other words, not all optical or capacitive sensors will have the same optimal force ranges. Therefore, the lookup table provides different optimal force ranges for many different types of sensors.

If the optimal pressure value is not detected at block 34, computer 14 provides feedback to a user as illustrated at block 36 and then continues to monitor the finger force at block 32. For example, computer 14 may provide a visual indication on the display 20, an audio indication via a speaker, or other indication to advise the user on how much pressure to apply to the fingerprint sensor 12. Depending upon the amount of pressure detected by force sensor 16, the user is either asked to press his finger harder or gentler on the fingerprint sensor 12.

Once the optimal pressure value is achieved and detected at block 36, the fingerprint sensor 12 and computer 14 begin capturing fingerprints as illustrated at block 38. Capturing the images after the optimal force range is determined, instead of before, provides certain advantages. The life of the fingerprint sensor 12 may increase since fewer fingerprints will be captured. Fingerprint data that is captured but unused increases data storage requirements for the sensor 12 and creates data retention issues. In addition, taking images which are not used can cause embarrassment and frustration for the individual being tested and the sensor operators when captured images are later rejected. The present system speeds up processing of individuals by not capturing images until the applied force is within the optimal range. This may reduce the time spent waiting in lines (throughput) at security checkpoints.

A plurality of fingerprints are captured after the force sensor 16 detects the optimal pressure value for the particular fingerprint sensor 12 as illustrated at block 40. Illustratively at least three fingerprint images are captured at block 40. Computer 14 then uses the quality analysis software discussed above to analyze the captured fingerprint images and select the image with the best quality score as illustrated at block 42. Therefore, the system and method of the present invention improves recognition and identification of fingerprints by detected by fingerprint sensor 12.

In an illustrated embodiment, the fingerprint sensor 12 includes a sensing portion for one finger. In another illustrated embodiment, the sensing portion is a 10-print fingerprint sensors. The system and methods described herein are applicable both single print and to 16-print fingerprint sensor. A 10-print fingerprint sensor illustratively operates on a three step process as follows:

1) Presenting all four fingers of the right hand to the sensor
2) Presenting all four fingers of the left hand to the sensor
3) Presenting both thumbs to the sensor In the 10-print sensor embodiment, the lookup table includes optimal force range measurements for each of the steps of the 10-print fingerprint sensor. This optimizes fingerprint images captured by the 10-print fingerprint sensor.

In another embodiment of the present disclosure, a method is provided for improving matching of fingerprints for verification or identification purposes. For example, fingerprint sensors may be used for criminal background checks, crime solving, employee background checks and credentialing, computer log-on or access control, check cashing authorization, secure area access control within buildings, drivers license verification, border control security, or other fraud protection services. The present system and method increases the likelihood that correct matches will be made accurately and promptly by using the image optimization systems and methods both during the initial acquisition of fingerprints to build the database and during the fingerprint sensing at the remote location for the verification or identification purposes discussed above.

Figure 11:
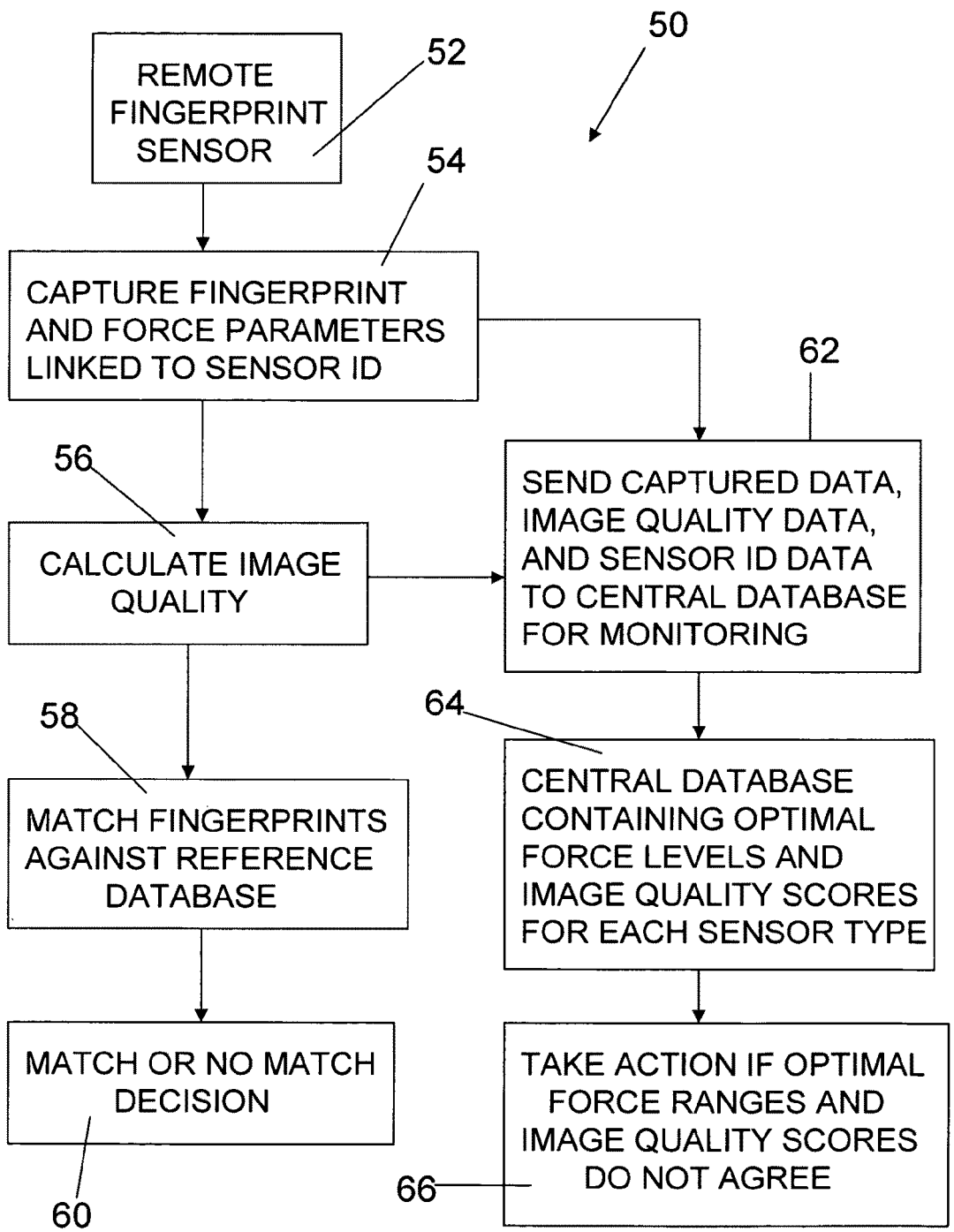
FIG. 11 is a flow chart of an improved method of verification and/or identification of fingerprint images.

FIG. 11 illustrates the method 50 of improving verification and/or identification of fingerprint images which includes the step of creating a database of optimal quality fingerprints. As discussed above, when taking fingerprints of individuals to create the database, the fingerprint sensor of FIG. 9 is used with the detection method of FIG. 10 when collecting the images to determine the highest quality fingerprint images for use in the database. These optimal quality fingerprint images are illustratively stored in a database in a memory of matching server computer. Such matching server computers are well known in the art. The present invention provides improved fingerprint images for use by image matching software.

The next step in the verification and identification process is to obtain fingerprints from an individual at a remote location. As discussed above, the fingerprints are collected for many purposes using a fingerprint sensor as illustrated in FIG. 9. The detecting method of FIG. 10 is used to obtain an optimal quality image from a remote fingerprint sensor as illustrated at block 52.

The remote fingerprint sensor captures at least one fingerprint and force parameters linked with a sensor identification at block 54. Next, the remote fingerprint sensor calculates an image quality score for the captured fingerprints as illustrated at block 56. The optimal quality remote image is then compared to the reference database of fingerprint images as illustrated at block 58. Matching software determines whether a match is made as illustrated at block 60. If a match is made, the matching software validates the identification. If a match is not made at block 60, the matching software provides a "no match" indication. For instance, if a particular fingerprint sensor is used for a computer log on, access control, border entry, or other verification or identification process, the matching software must validate the identification before the individual can proceed with a particular activity.

In an illustrated embodiment, the remote fingerprint sensor sends the captured data, calculated image quality, and sensor identification to a central database for monitoring as illustrated at block 62. The central database contains the optimal force levels and image quality scores for each type of sensor as illustrated at block 64 and discussed above. A computer coupled to the central database illustratively monitors the data received from block 62 and compares the received data to the optimal force levels and image quality scores in the database at block 64.

The computer takes an appropriate action if the force parameters or the image quality scores received from a particular remote fingerprint sensor differ from the optimal force levels or optimal image quality scores stored in the central database as illustrated at block 66. In one illustrated embodiment, the action is alerting a user of the remote fingerprint sensor that servicing is required. In another illustrated embodiment, the action is updating at least one of the optimal force range and the optimal image quality scores for the particular fingerprint sensor in a database based on at least one of the received image quality score and force parameter received from the remote fingerprint sensor.

Therefore, the system and method monitors performance of the fingerprint sensors over time. For example, if fingerprint sensors are operating within optimal force ranges, but the image quality of the images detected by the force sensor are less than the expected optimal image quality, the system and method may provide an indication that the fingerprint sensor needs servicing or replacement.

In another embodiment of the present invention, a system and method monitors other factors which influence fingerprint quality such as age, ethnicity, and environment. For example, different force levels may provide optimal readings for a particular fingerprint sensor depending upon the age or ethnicity of the user, the environment, or other factors. These factors may be included in the lookup table as additional options for further improving the optimal image quality.

While the invention has been illustrated and described in detail in the drawings and foregoing description, the description is to be considered as illustrative and not restrictive in character. Only the illustrated embodiments, and such alternative embodiments deemed helpful in further illuminating the illustrated embodiments, have been shown and described. Therefore, variations and modifications exist within the scope and spirit of the present invention as defined in the following claims.

What is claimed is:

1. A method of optimizing performance of a fingerprint sensor, the method comprising:
creating a lookup table of optimal force ranges for initiating fingerprint acquisition in a plurality of different fingerprint sensors by testing the plurality of different fingerprint sensors at a plurality of force levels and performing at least one of an image quality analysis and a performance analysis to determine the optimal force range for each different fingerprint sensor;
detecting placement of at least one finger on the fingerprint sensor;
determining a force applied to the sensor by the at least one finger;
determining an optimal force range for the fingerprint sensor by accessing the lookup table stored in a computer memory;
determining whether the force is within the optimal force range for the fingerprint sensor;
providing feedback to a user to adjust the applied force if the applied force is outside the optimal force range; and
capturing at least one fingerprint image with the fingerprint sensor after the applied force is in the optimal force range.

2. The method of claim 1, wherein the capturing step captures a plurality of fingerprint images.

3. The method of claim 2, further comprising comparing the plurality of captured fingerprint images and selecting an optimal fingerprint image based on the comparing step, wherein the comparing step is performed by analyzing a number of detected minutiae in the plurality of fingerprint images.

4. The method of claim 3, wherein the number of detected minutiae is detected using an analysis of variance test performed at a significance level of about 0.05.

5. The method of claim 1, wherein the fingerprint sensor is an optical sensor and the optimal force range is about 4N to about 9N.

6. The method of claim 1, wherein the fingerprint sensor is a capacitive sensor and the optimal pressure range is about 3N to about 7N.

7. The method of claim 1, wherein the computer memory is located at a remote location from the fingerprint sensor, the fingerprint sensor accessing with the computer memory including the lookup table via a communication network.

8. The method of claim 1, wherein the image quality analysis is performed using image quality analysis software on a computer, the image analysis software providing an output score indicating a quality of each fingerprint image.

9. The method of claim 1, wherein performance is analyzed using false reject rates and false accept rates.

10. The method of claim 9, wherein a force range detected by a force sensor which produces the highest quality images and lowest levels of false reject rates and false accept rates is selected as the optimal force range for a particular fingerprint sensor.

11. The method of claim 1, wherein providing feedback to a user to adjust the applied force if the applied force is outside the optimal force range comprises instructing the user to press his finger harder or gentler on the fingerprint sensor depending upon the determined force applied to the sensor.

12. The method of claim 1, wherein the capturing step captures a plurality of fingerprint images, and further comprising:
analyzing an image quality to determine image quality scores of the plurality of captured fingerprint images; and
determining an optimal fingerprint image to use from the plurality of fingerprint images based on the determined image quality scores of the of the plurality of captured fingerprint images.

13. The method of claim 12, wherein the optimal fingerprint image is determined from the plurality of fingerprint images by selecting an image with the best image quality score.

14. A sensing apparatus comprising:
a fingerprint sensor having a sensing portion to receive at least one finger of a person;
a force sensor coupled to the fingerprint sensor to detect a finger pressure on the sensing portion of the fingerprint sensor;
a processor coupled to the fingerprint sensor and the force sensor;
an indicator coupled to the processor;
a memory coupled to the processor;
a lookup table stored in the memory, the lookup table including a plurality of optimal force ranges for initiating fingerprint acquisition in a plurality of different fingerprint sensors, the optical force ranges being determined by testing the plurality of different fingerprint sensors at a plurality of force levels and performing at least one of an image quality analysis and a performance analysis to determine the optimal force range for each different fingerprint sensor; and
software executable by the processor for accessing the lookup table stored in the computer memory to determine the optimal force range for the fingerprint sensor for detecting placement of at least one finger on the fingerprint sensor, for determining a force applied to the sensor by the at least one finger, for determining whether the force is within the optimal force range for the fingerprint sensor, for providing feedback to the indicator to advise a user to adjust the applied force if the applied force is outside the optimal force range, and for capturing a plurality of fingerprint images with the fingerprint sensor after the applied force is in the optimal force range.

15. The apparatus of claim 14, wherein the fingerprint sensor is a 10-print fingerprint sensor.

16. The apparatus of claim 14, wherein the memory is located at a remote location from the fingerprint sensor, the fingerprint sensor accessing with the memory via a communication network.

17. The apparatus of claim 14, wherein providing feedback to a user to adjust the applied force if the applied force is outside the optimal force range comprises software executable by the processor for instructing the user to press his finger harder or gentler on the fingerprint sensor depending upon the determined force applied to the sensor.

18. The apparatus of claim 14, further comprising software executable by the processor for analyzing an image quality to determine image quality scores of the plurality of captured fingerprint images, and for determining an optimal fingerprint image to use for identifying, recognizing and/or authenticating the fingerprints from the plurality of fingerprint images based on the determined image quality scores of the of the plurality of captured fingerprint images.

19. The apparatus of claim 18, wherein the optimal fingerprint image is determined from the plurality of fingerprint images by selecting an image with the best image quality score.

* * * * *